United States Patent [19]

Takaishi

[11] Patent Number: 4,731,566
[45] Date of Patent: Mar. 15, 1988

[54] INTERMITTENT DRIVE CONTROLLER FOR WINDSHIELD WIPER MOTOR

[75] Inventor: Yukio Takaishi, Aichi, Japan

[73] Assignee: Kabushiki-Kaisha Tokai-Rika-Denki-Seisakusho, Japan

[21] Appl. No.: 940,096

[22] Filed: Dec. 10, 1986

[30] Foreign Application Priority Data

Dec. 12, 1985 [JP] Japan .............................. 60-191526[U]

[51] Int. Cl.$^4$ ............................ B60S 1/08; H02P 3/12
[52] U.S. Cl. .............................. 318/444; 318/DIG. 2; 15/250 C; 15/250.17
[58] Field of Search ................. 318/443, 444, DIG. 2, 318/466, 483; 15/250 C, 250.04, 250.12, 250.13, 250.17

[56] References Cited

U.S. PATENT DOCUMENTS

| | | | |
|---|---|---|---|
| 3,581,178 | 5/1971 | Kearns | 318/443 |
| 3,582,747 | 6/1971 | Kearns | 318/443 X |
| 3,728,603 | 4/1973 | Kearns | 318/DIG. 2 X |
| 3,774,091 | 11/1973 | Kearns | 318/443 X |
| 4,339,698 | 7/1982 | Kearns | 318/444 |

Primary Examiner—Bentsu Ro
Attorney, Agent, or Firm—Robbins & Laramie

[57] ABSTRACT

An intermittent drive controller for a windshield wiper having a drive circuit for driving a wiper motor, a drive command circuit connected to the drive circuit by way of a semiconductor device, and a braking circuit related to the above circuits. When a wiper switch is operated, the wiper motor is driven, thereby starting the wiping movement of the wiper. When the wiper motor pauses, the motor switch outputs a pause signal, thereby instantly stopping the wiper motor. On the other hand, after a certain period of time has passed, a new drive command signal is supplied from the drive command circuit to the drive circuit, thereby driving the wiper motor again, thus effecting the intermittent drive control. This arrangement employs no electromagnetic relays so that it is free from noise which may generate when the wipe motor starts or stops and from malfunctions due to imperfect contact, thus improving the durability. Also it can positively control the wiper motor by braking the wiper at the moment in which the motor pauses.

5 Claims, 2 Drawing Figures

INTERMITTENT DRIVE CONTROLLER FOR WINDSHIELD WIPER MOTOR

BACKGROUND OF THE INVENTION

1. Field of the Invention

This invention relates to a controller for intermittently driving a windshield wiper, more particularly to a controller for intermittently driving a windshield wiper motor.

2. Description of the Prior Art

In general, a conventional apparatus of this kind is designed to control a wiper motor for driving a wiper so that the motor can move the wiper at a high or low speed, or intermittently in accordance with the operation of a wiper switch disposed in a driver's compartment.

In a conventional arrangement such as the one disclosed in Japanese Patent laid-Open No. 1224/1980, a relay is employed to control the motor for driving the wiper in order to move the wiper intermittently. However, when the relay operates, it generates noise which is unpleasant, and there is also a problem of imperfect contact caused by deterioration due to age deterioration.

SUMMARY OF THE INVENTION

It is an object of the present invention to provide an intermittent drive controller for a windshield wiper motor which is free from the defects of the above-described conventional controller.

To this end, the present invention provides an intermittent drive controller for a windshield wiper motor comprising: a motor switch which is opened and closed in a linked relationship with the rotation of the wiper motor, thereby detecting the states of the wiper motor whether it is in operation or at pause, and outputting these states; a drive command circuit which outputs a drive command signal in accordance with the operations of the wiper switch and which outputs a drive command signal in response to a pause signal which is supplied from the motor switch when the wiper motor pauses, the command signal is produced after a certain period of time has passed from the moment at which the wiper motor pauses; a drive circuit which makes a semiconductor device operate to drive the wiper motor; and a brake circuit which inhibits the drive command signal from entering into the drive circuit in response to a pause signal supplied each time the wiper motor pauses and which forms a braking loop of the wiper motor for a certain period of time.

In the intermittent drive controller in accordance with the present invention, when the wiper switch is operated, a drive command signal is supplied from the drive command circuit to the drive circuit, thereby driving the wiper motor and effecting the wiping movement of the wiper. In response to the end of the wiping movement of the wiper, namely, a pause signal from the motor switch at the moment when the wiper motor operation pauses, the brake circuit inhibits the drive command signal from entering into the drive circuit while forming a braking loop of the wiper motor at the drive circuit for a certain period of time, thereby instantly braking the wiper motor. After a certain period of time has passed from the end of this wiper operation cycle, a drive command signal is again supplied from the drive command circuit to the drive circuit whereby the wiper motor is actuated again. This cycle of operating the wiper motor is repeated, thus controlling and driving the wiper motor in the intermittent manner.

The intermittent drive controller for a wiper motor in accordance with the present invention operates in the manner described above, and this arrangement ensures that the noise caused by the operation of the wiper motor is reduced and that the lifetime of the motor driving mechanism is extended since the motor drive command circuit and the wiper motor driving circuit are formed by groups of semiconductors and connected to each other by way of a semiconductor device so as to intermittently operate the wiper motor. In addition, the intermittent operation of the wiper motor is securely effected because the wiper motor is braked at the moment when the wiper motor pauses.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

Figure 1:
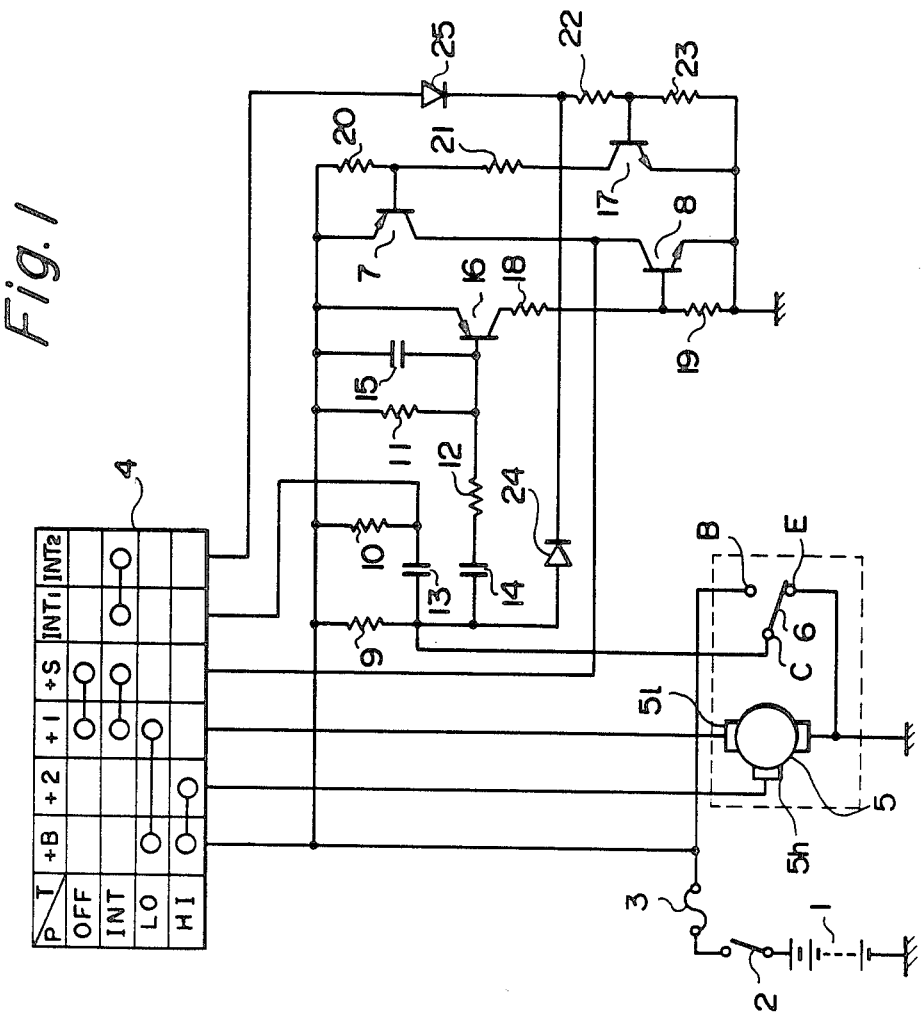
FIG. 1 is a circuit diagram of an intermittent drive controller for a wiper motor which represents a first embodiment of the present invention.

FIG. 1 shows an arrangement of a first preferred embodiment of the present invention. As shown in FIG. 1, a battery 1 is connected to a wiper switch 4 and to the motor switch 6 by way of an ignition switch 2 and fuse 3. The wiper switch 4 has six terminals +B, +2, +1, +S, INT1 and INT2, and four operational positions OFF, INT, LO and HI. When it is set in the OFF position, the terminals +1 and +S are interconnected; at the position INT, the terminals +1 and +S are interconnected while the terminals INT1 and INT2 are interconnected; at the position LO, the terminals +B and +1 are interconnected; and at the position HI, the terminals +B and +2 are interconnected. The terminal +B is connected to the power supply line; the terminal +2 to a high-speed terminal 5h of a wiper motor 5; the terminal +1 to a low-speed terminal 5l; the terminal +S to collectors of power transistors 7 and 8; the terminal INT1 to the point of connection between a resistor 10 and a capacitor 13; and the terminal INT2 to the side of the anode of a diode 25.

The motor switch 6 has a common contact C and terminals E and B and operates in a linked relationship with the rotation of the wiper motor 5 to change over the common contact C between the terminals E and B. The terminal E of the motor switch 6 is grounded, and the common contact C is connected to the point of contact between a resistor 9 and the capacitor 13. As the wiper motor 5 starts to rotate, the common contact C of the motor switch 6 is immediately changed from the terminal E to the terminal B, thereby supplying an operation signal. After the wiper motor 5 has made one revolution, the common contact C is changed from the terminal B to the terminal E, thereby detecting the pause of the intermittent operation cycle of the wiper and outputting a pause signal. When the wiper switch 4 is set in the position LO, electric power is supplied to the low-speed terminal 5l of the wiper motor 5 by way of the terminals +B and +1 of the wiper switch 4, and the motor 5 therefore rotates at a low speed. When the wiper switch 4 is set in the position HI, electric power is supplied to the high-speed terminal 5h of the motor 5 by way of the terminals +B and +2 of the wiper switch 4, so that the motor 5 rotates at a high speed. Accordingly, the level of operation signal corresponds to that of the power source, and the pause signal is at the ground level.

The resistances 9 and 10, the capacitor 13 and the diodes 24 and 25 are arranged to constitute a drive command circuit; the power transistor 7, a transistor 17, resistances 20, 21, 22 and 23 constitute a drive circuit; and a transistor 16, the power transistor 8, resistances 11, 12, 18 and 19 and capacitors 14 and 15 constitutes a brake circuit. These circuits are so arranged as to intermittently operate the wiper motor 5.

When the ignition switch 2 is turned on, the common contact C of the motor switch 6 is grounded through the terminal E, in other words, it outputs a pause signal, so that the capacitor 13 is charged through the resistance 10. When the wiper switch 4 is thereafter set in the position INT, the electric charge of the capacitor 13 is supplied to the drive command circuit by way of the terminals INT1 and INT2 and the diode 25. The transistor 17 is thereby turned on and the base of the power transistor 7 is biased. In other word, when the wiper switch 4 is set in the position INT, the drive command circuit outputs a drive command signal to the base of the power transistor 7, that is, while the transistor 17 is turned on, the power transistor 7 is turned on, so that the power is supplied to the low-speed terminal 5l of the wiper motor 5 by way of the emitter and collector of the power transistor 7 and the terminals +S and +1 of the wiper switch 4, thereby starting the low-speed rotation of the wiper motor 5. Then, the common contact C of the motor switch 6 is changed from the terminal E to the terminal B, and the base of the power transistor 7 in the driving circuit is supplied with the drive command signal by way of the diode 24 and the transistor 17. Therefore, even when the discharge of the capacitor 13 is completed, the ON state of the drive circuit can be maintained by the drive command signal supplied through the diode 24, so long as the common contact C of the motor switch 4 is maintained at the side of the terminal B.

After the wiper motor 5 has made one revolution and after one wiper operation cycle has been completed, the contact of the motor is changed from the terminal B to the terminal E to output a pause signal. The diode 24 is grounded at the anode side, and the base of the transistor 17 is reversely biased so that the transistor 17 is turned off in an instant and the power transistor 7 is turned off at the same time. At this time, a charging current flows to the capacitor 14 by way of the resistances 11 and 12, thereby biasing the base of the transistor 16 so as to turn on the transistor 16. Simultaneously, the base of the power transistor 8 is biased through the collector of the transistor 16, thereby turning on the power transistor 8, so that the low-speed terminal 5l of the wiper motor 5 is grounded and the wiper motor 5 is braked. This state is maintained until the charging of the capacitor 14 is completed. That is, the braking loop of the wiper motor 5 is formed for a certain period of time while the power transistor 8 is in the ON state. Incidentally, the diode 24 also functions as an element of the brake circuit which operates to inhibit the drive command signal from entering the drive circuit.

On the other hand, when the contact of the motor switch 6 is changed from the terminal B to the terminal E, the charging of the capacitor 13 is started. When the collecting voltage of the capacitor 13 increases above the set point, the electric charge of the capacitor 13 is again supplied through the diode 25 to the base of the transistor 17, thereby turning on the transistor 17 to turn on the power transistor 7. Then, the wiper motor 5 starts to rotate again. The same operation as described above is therafter repeated. Thus a intermittent cycle of the wiper motor 5 in which the wiper motor does not operate during a period of time took for charging the capacitor 13. As the wiper motor 5 is intermittently driven, the wiper is intermittently set in the operative state. Since a time constant defined by the resistance 10 and the capacitor 13 and another time constant defined by the resistance 12 and the capcitor 14 are determined such that the power transistor 8 is turned off when the power transistor 7 is turned on, the power transistor 8 does not turn on while the power transistor 7 is on.

In this embodiment, even when, before one revolution of the wiper motor 5 is completed, the wiper switch 4 is changed from the position LO or HI in which the switch has been previousely set to the OFF position, the base current is supplied to the transistor 17 by way of the diode 24 since the common contact C of the motor switch 6 is connected to the power line through the terminal B. The power transistor 7 is therefore maintained in the ON state, and the wiper motor 5 rotates at a low-speed and makes one revolution. After the wiper motor 5 has made one revolution to change the contact of the motor switch 6 to the side of the terminal E, the operation of driving the wiper motor 5 is stopped. That is, when the wiper is in an intermediate position, the wiper can returns to its original position even if the wiper switch 4 is changed from the positions LO or HI to the OFF position.

In this embodiment, as described above, the wiper motor 5 is driven by the groups of semiconductors, thereby preventing noise from generating from the wiper drive circuit and extending the lifetime of the circuit.

Figure 2:
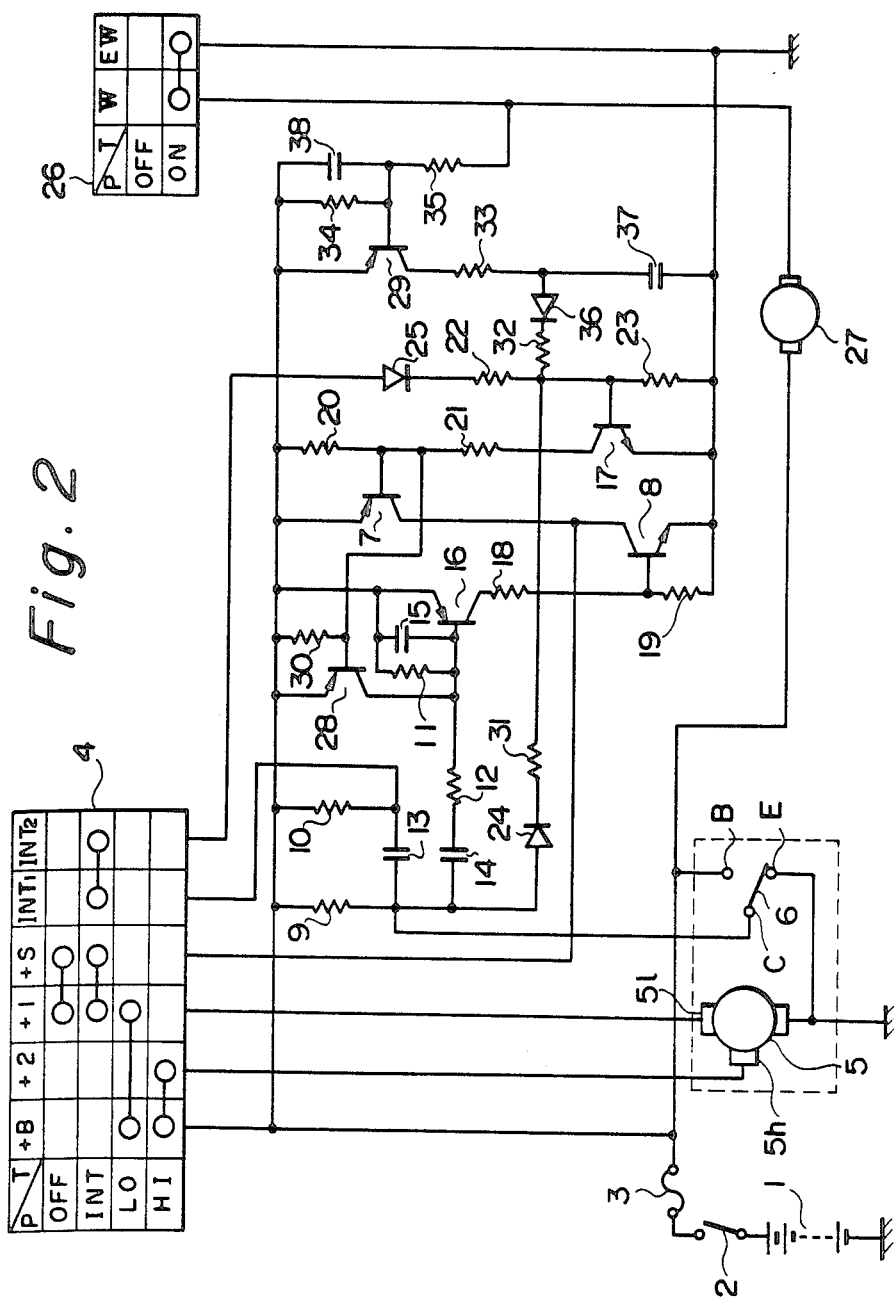
FIG. 2 is a circuit diagram of a second embodiment of the present invention.

FIG. 2 shows the arrangement of a second embodiment of the present invention.

In this embodiment, transistors 28 and 29, resistances 30, 31, 33, 34 and 35, a diode 36, and capacitors 37 and 38 are added to the arrangement of the first embodiment in order to operate a windscreen washer motor 27 in accordance with the operation of a windscreen washer switch 26. The arrangement is similar to that of the first embodiment except for these constituents. Constituents having the same functions as those of the constituents in the first embodiment are given the same reference numerals and the descriptions for these parts will not be repeated.

The windscreen washer switch 26 has two positions OFF and ON, a terminal EW which is grounded, and a terminal W which is connected to the resistor 35 and to one end of the windscreen washer motor 27. The windscreen washer switch 26 is arranged such that when the switch 26 is set in the position ON, the terminals W and EW are connected to each other.

When the wind screen washer switch 26 is set in the position ON, the terminal W is grounded and a charging circuit is formed at the capacitor 38 by the resistor 35, thereby supplying a base current to the base of the transistor 29 to turn on the transistor 29 after a certain period of time has passed. When the transistor 29 is turned on, a charging current flows to the capacitor 37 through the resistor 33 while a base current of the transistor 17 flows through the resistance 33, the diode 36 and the resistance 32, thereby turning on the transistor 17. After the transistor 17 has turned on, the base of the transistor 7 is biased so that the power transistor 7 is turned on, thereby rotating the wiper motor 5 at a low speed. At this time, electric power is supplied from the battery 1 to the windscreen washer motor 27 through terminal W to ground, thus rotating the motor 27.

On the other hand, when the transistor 17 is turned on, the transistor 28 is also turned on. During the ON state of the transistor 28, the transistor 16 is hindered from turning on, and the OFF state of the power transistor 8 is maintained. When the windscreen washer switch 26 is thereafter set in the OFF position, the operation of the windscreen washer motor 27 is stopped and the transistor 29 is turned off. After the transistor 29 has turned off, an electric charge of the capacitor 37 flows into the base of the transistor 17 by way of the diode 36 and the resistance 32, thereby maintaining the ON state of each of the transistor 17 and the power transistor 7. While the wiper motor 5 is rotating, the base current flows into the base of the transistor 16 by way of the terminal B of the motor switch 6, the diode 24 and the resistance 31 so as to maintain the ON state of the transistor 17, even when the discharge of the capacitor 37 is completed after a certain period of time. After the wiper motor 5 has made one revolution and after the contact of the motor switch 6 has been changed from the terminal B to the terminal E so as to ground the diode 24 at the anode side, the transistor 17 is turned off and then the power transistor 7 in turned off. A charging current thereafter flows to the capacitor 14, as in the case of the first embodiment, so that the transistor 16 is turned on and then the power transistor 8 is turned on, thereby forming a braking loop which functions to ground the low-speed terminal 5*l* of the wiper motor 5 for a period of time which is took for charging the capacitor 14. The wiper motor 5 is thereby instantly stopped.

Incidentally, power MOS FETs are also applicable in place of the power transistors in these arrangements.

Thus, in the second embodiment, it is possible for the wiper motor 5 to be operated in a linked relationship with the windscreen washer motor. Moreover, the noise generated by the driving circuits for the wiper motor 5 and the washer motor 27 can be eliminated and the lifetime of each driving circuits can be extended.

What is claimed is:

1. An intermittent drive controller for a windshield wiper motor comprising:

a wiper switch for turning the drive controller on and off a motor switch operated in a linked relationship with the rotation of said wiper motor so as to be changed over between first and second terminals, said motor switch completing a circuit when change over to the first terminal and producing an operation signal for the motor, and said motor switch completing a circuit when changed over to the second terminal and producing a pause signal for said motor;

a drive command circuit responsive to the wiper switch and the motor switch for producing a drive command signal when the wiper switch is turned on and after a certain period of time has passed from the moment at which said motor switch is changed from the first to the second terminal;

a windscreen washer motor for driving a pump adapted for ejecting windscreen washer fluid and a windscreen washer switch for turning the windscreen washer motor on and off;

a washer drive circuit for producing a drive command signal when said windscreen washer switch is turned on;

a drive circuit for driving said wiper motor in response to the drive command signal from said drive command circuit; and a brake circuit for immediately hindering said drive command signal when said motor switch is changed over from said first to said second terminal, said brake ciruit simultaneously forming a braking loop of said wiper motor for a short time.

2. An intermittent drive controller for a windshield wiper motor according to claim 1, wherein, while said motor switch is producing said pause signal, said drive command circuit produces said drive command signal when said drive command circuit is turned on by said wiper switch.

3. An intermittent drive controller for a windshield wiper motor according to claim 1, wherein said drive command circuit constantly produces a drive command signal while said motor switch is producing said operation signal.

4. An intermittent drive controller for a windshield wiper motor according to claim 1, further including a plurality of semiconductor devices for operating said drive circuit including at least one power transistor.

5. An intermittent drive controller for a windshield wiper motor according to claim 1, wherein said operation signal is at the level of a power source, and said pause signal is at the level of the ground.

* * * * *